Patented Mar. 30, 1937

2,075,022

UNITED STATES PATENT OFFICE 2,075,022

ORANGE DISAZO DYES

Moses L. Crossley, Plainfield, and Lincoln M. Shafer, Highland Park, N. J., assignors to The Calco Chemical Company, Inc., Bound Brook, N. J., a corporation of Delaware No Drawing. Application August 14, 1935
Serial No. 36,122

12 Claims. (Cl. 260—78)

This invention relates to new azo dyes and particularly to new azo dyes suitable for dyeing wool and silk colors showing an excellent fastness to milling.

The azo dyes of the present invention are obtained by coupling tetrazotized benzidine disulfonic acids and particularly the 2,2' disulfonic acids of benzidine and their alkyl and alkoxy derivatives, with alkyl phenols in which the alkyl group contains more than two carbon atoms as the first component and naphthols such as alpha-betanaphthols, naphthoic acids and naphthol sulfonic and sulfonic acids as a second. The benzidine compound is usually tetrazotized in the usual manner and coupled in alkaline solution first with the alkylphenol and then with the naphthol. The resulting dyes produce various shades of orange on fibers. The dyes obtained from the disulfonic acid dye wool and silk colors that are fast to milling, light, washing, fulling, acids and alkalis. They discharge white when dyed on silk weighted with tin.

The invention will be described in detail in connection with the following specific examples which are representative illustrations but do not limit the invention. The parts are by weight.

Example 1

17.2 parts of benzidine 2,2'-disulfonic acid are mixed with 250 parts of water and 20 parts of a 20% solution, by weight, of sodium hydroxide. The mixture is stirred and cooled by the addition of ice to between 10 and 15° C. 45 parts of a 16% hydrochloric acid solution is added. The mixture is then treated with sodium nitrite until a positive test is secured, indicating that diazotization is complete. The excess of mineral acid is neutralized with sodium bicarbonate. A solution containing 8.4 parts of commercial paratertiary amyl phenol, 200 parts of water, and 10.5 parts of a 20%, by weight, solution of sodium hydroxide is added and the mixture stirred for about one-half hour, or until the amyl phenol is coupled. Then a solution containing 7.8 parts of betanaphthol, 30 parts of water and 10 parts of a 20% by weight solution of sodium hydroxide is prepared. This is diluted with water to about 150 parts. 10 parts of soda ash is then added to this solution and it is then added to the diazo solution. The mixture is stirred for 12 to 16 hours and the dye salted out, after the solution has been acidified with acetic acid, with sodium chloride. The product is an orange powder which dyes wool a level tone of orange of excellent fastness. It has the following structural formula:

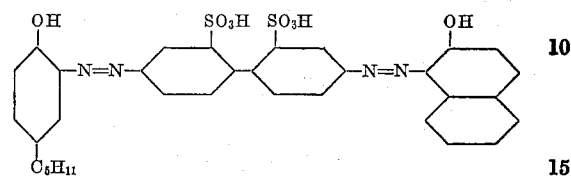

Instead of using para-tertiary amyl phenol, the other isomeric amyl phenols may be employed giving dyes having very similar shades.

Example 2

18.2 parts of tolidine 2,2'-disulfonic acid are mixed with 250 parts of water and 20 parts of a 20% solution, by weight, of sodium hydroxide. The mixture is stirred and cooled by the addition of ice between 10° and 15° C. 45 parts of a 16% hydrochloric acid solution is added. The mixture is then treated with sodium nitrite until a positive test is secured, indicating that diazotization is complete. The excess of mineral acid is neutralized with sodium bicarbonate. A solution containing 7 parts of isopropyl phenol, 200 parts of water, and 10.5 parts of a 20%, by weight, solution of sodium hydroxide is added and the mixture stirred for about one-half hour, or until the isopropyl phenol is coupled. Then a solution containing 7.8 parts of betanaphthol, 30 parts of water and 10 parts of a 20%, by weight, solution of sodium hydroxide is prepared. This is diluted with water to about 150 parts. 10 parts of soda ash is then added to this solution and it is then added to the diazo solution. The mixture is stirred for 12 to 16 hours and the dye salted out, after the solution has been acidified with acetic acid, with sodium chloride. The product is an orange powder which dyes wool a level tone of orange of excellent fastness. It has the following structural formula:

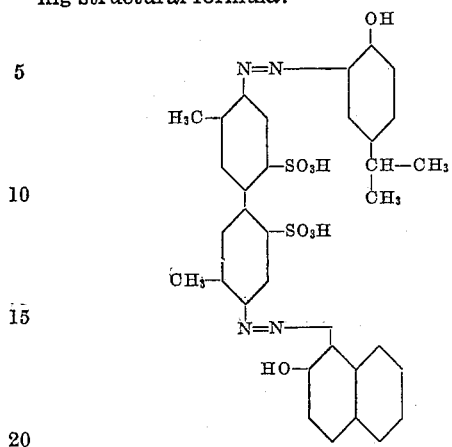

Instead of using the isopropyl phenol the normal butyl or secondary butyl phenol may be substituted and dyes will be obtained which are very similar in shade to the one described above.

*Example 3*

20.2 parts of dianisidine 2,2'-disulfonic acid are mixed with 250 parts of water and 20 parts of a 20% solution, by weight, of sodium hydroxide. The mixture is stirred and cooled by the addition of ice to between 10° and 15° C. 45 parts of a 16% hydrochloric acid solution is added. The mixture is then treated with sodium nitrite until a positive test is secured, indicating that diazotization is complete. The excess of mineral acid is neutralized with sodium bicarbonate. A solution containing 9 parts of a hexyl phenol, 200 parts of water, and 10.5 parts of a 20%, by weight, solution of sodium hydroxide is added and the mixture stirred for about one-half hour, or until the hexyl phenol is coupled. Then a solution containing 7.8 parts of betanaphthol, 30 parts of water and 10 parts of a 20%, by weight, solution of sodium hydroxide prepared. This is diluted with water to about 150 parts. 10 parts of soda ash is then added to this solution and it is then added to the diazo solution. The mixture is stirred for 12 to 16 hours and the dye salted out, after the solution has been acidified with acetic acid, with sodium chloride. The product is an orange red powder which dyes wool a level tone of orange red of excellent fastness. It has the following structural formula:

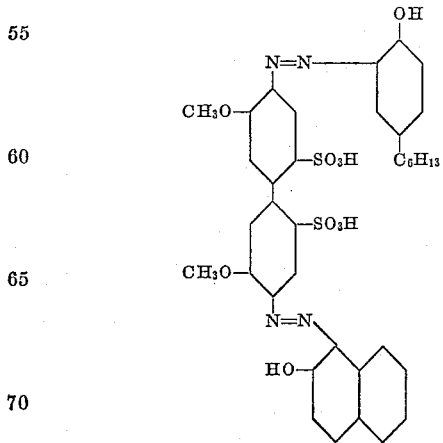

*Example 4*

17.2 parts of benzidine 3,3' disulfonic acid are mixed with 250 parts of water and 20 parts of a 20% solution, by weight, of sodium hydroxide. The mixture is stirred and cooled by the addition of ice to between 10° C. and 15° C. 45 parts of a 16% hydrochloric acid solution is added. The mixture is then treated with sodium nitrite until a positive test is secured, indicating that diazotization is complete. The excess of mineral acid is neutralized with sodium bicarbonate. A solution containing 10.3 parts of an octyl phenol, 200 parts of water, and 10.5 parts of a 20%, by weight, solution of sodium hydroxide is added and the mixture stirred for about ½ hour, or until the octyl phenol is coupled, then a solution containing 7.8 parts of alpha naphthol, 30 parts of water and 10 parts of a 20%, by weight, solution of sodium hydroxide is prepared. This is diluted with water to about 150 parts. 10 parts of soda ash is then added to this solution and it is then added to the diazo solution. The mixture is stirred for 12 to 16 hours and the dye salted out, after the solution has been acidified with acetic acid, with sodium chloride.

The product is an orange powder which dyes both vegetable and animal fibers level tones of orange color. It has the following structural formula:

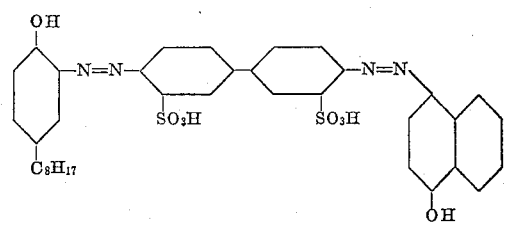

*Example 5*

17.2 parts of benzidine 3,3' disulfonic acid are mixed with 250 parts of water and 20 parts of a 20% solution, by weight, of sodium hydroxide. The mixture is stirred and cooled by the addition of ice to between 10° C. and 15° C. 45 parts of a 16% hydrochloric acid solution is added. The mixture is then treated with sodium nitrite until a positive test is secured, indicating that diazotization is complete. The excess of mineral acid is neutralized with sodium bicarbonate. A solution containing 8.4 parts of para-amylphenol, 200 parts of water, and 10.5 parts of a 20%, by weight, solution of sodium hydroxide is added and the mixture stirred for about one-half hour, or until the amylphenol is coupled, then a solution containing 12 parts of J acid (2-amino-5-naphthol-7-sulfonic acid), 30 parts of water and 10 parts of a 20%, by weight, solution of sodium hydroxide is prepared. This is diluted with water to about 150 parts. 10 parts of soda ash is then added to this solution and it is then added to the diazo solution. The mixture is stirred for 12 to 16 hours and the dye salted out, after the solution has been acidified with acetic acid, with sodium chloride. The product is a dark colored powder which dyes both animal and vegetable fibers level tones of reddish blue to violet colors. It has the following structural formula:

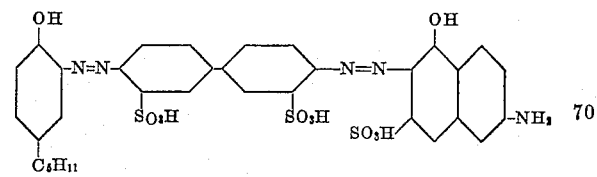

*Example 6*

17.2 parts of benzidine 3,3' disulfonic acid are mixed with 250 parts of water and 20 parts of a 20% solution, by weight, of sodium hydroxide. The mixture is stirred and cooled by the addition of ice to between 10° C. and 15° C. 45 parts of a 16% hydrochloric acid solution is added. The mixture is then treated with sodium nitrite until a positive test is secured, indicating that diazotization is complete. The excess of mineral acid is neutralized with sodium bicarbonate. A solution containing 10.3 parts of an octyl phenol, 200 parts of water, and 10.5 parts of a 20%, by weight, solution of sodium hydroxide is added and the mixture stirred for about ½ hour, or until the octyl phenol is coupled, then a solution containing 13.2 parts of naphthol AS (the anilide of beta-hydroxynaphthoic acid), 30 parts of water and 10 parts of a 20%, by weight, solution of sodium hydroxide is prepared. This is diluted with water to about 150 parts. 10 parts of soda ash is then added to this solution and it is then added to the diazo solution. The mixture is stirred for 12 to 16 hours and the dye salted out, after the solution has been acidified with acetic acid, with sodium chloride.

The product is an orange-red powder which dyes both animal and vegetable fibers level tones of orange-red of good fastness properties. It has the following structural formula:

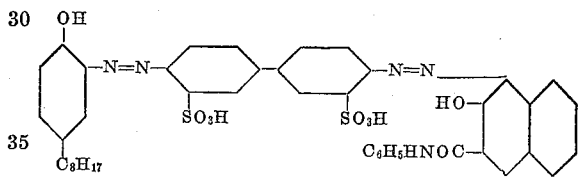

What is claimed is:

1. Orange to red or red violet disazo dyes having the following formula:

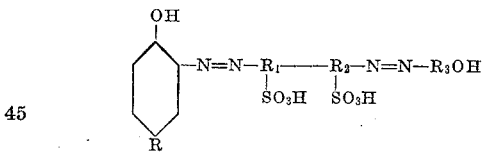

in which R is an alkyl group having more than two carbon atoms, $R_1$—$R_2$ is a benzidine nucleus and $R_3$ is a naphthalene nucleus.

2. Orange disazo dyes having the following formula:

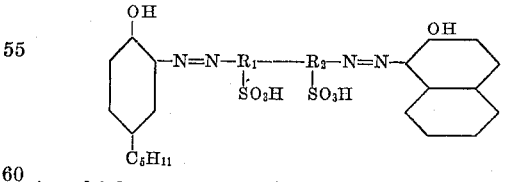

in which $R_1$—$R_2$ is a benzidine nucleus, the dyes when dyed on silk and wool being characterized by excellent fastness to milling.

3. Orange disazo dyes having the following formula:

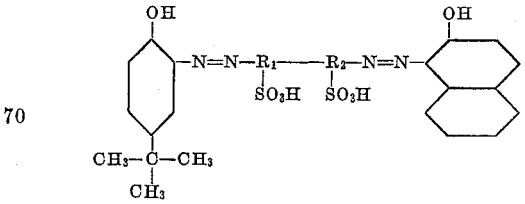

in which $R_1$—$R_2$ is a benzidine nucleus, the dyes when dyed on silk and wool being characterized by excellent fastness to milling.

4. Orange disazo dyes having the following formula:

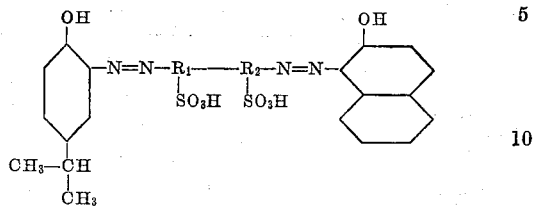

in which $R_1$—$R_2$ is a benzidine nucleus, the dyes when dyed on silk and wool being characterized by excellent fastness to milling.

5. Orange disazo dyes having the following formula:

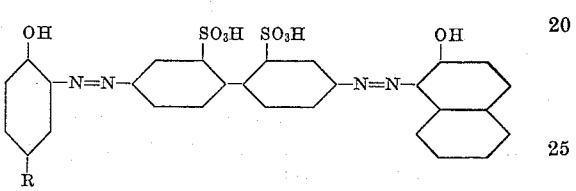

in which R is an alkyl group having more than two carbon atoms, the dyes when dyed on silk and wool being characterized by excellent fastness to milling.

6. Orange disazo dyes having the following formula:

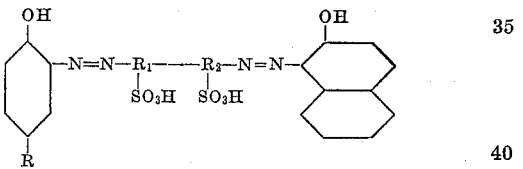

in which R is an alkyl group having more than two carbon atoms, $R_1$—$R_2$ is a substituted benzidine nucleus having at least one substituent group taken from the class consisting of alkyl groups and alkoxy groups, the dyes when dyed on silk and wool being characterized by excellent fastness to milling.

7. Orange disazo dyes having the following formula:

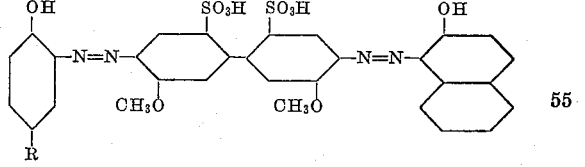

in which R is an alkyl group having more than two carbon atoms, the dyes when dyed on silk and wool being characterized by excellent fastness to milling.

8. Orange disazo dyes having the following formula:

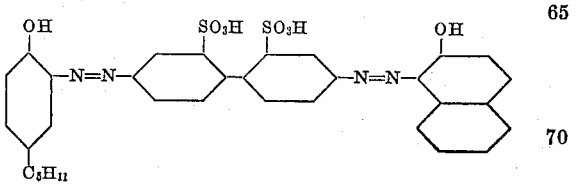

the dyes when dyed on silk and wool being characterized by excellent fastness to milling.

9. An orange disazo dye having the following formula:

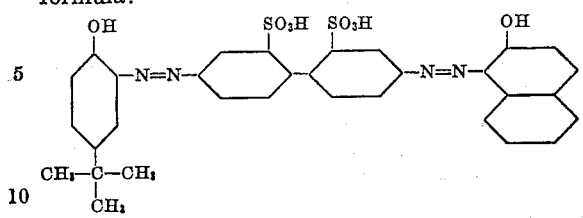

the dyes when dyed on silk and wool being characterized by excellent fastness to milling.

10. Orange to red or red-violet disazo dyes having the following formula:

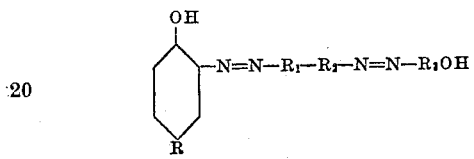

in which R is an alkyl group having more than two carbon atoms, $R_1$—$R_2$ is a 3,3' benzidine disulfonic acid, and $R_3$ is a naphthalene nucleus.

11. Orange to red or red-violet disazo dyes having the following formula:

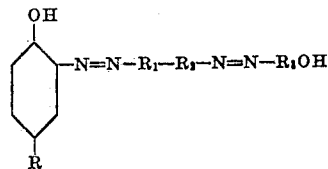

in which R is an alkyl group having more than two carbon atoms, $R_1$—$R_2$ is a 2,2' benzidine disulfonic acid, and $R_3$ is a naphthalene neucleus.

12. Orange disazo dyes having the following formula:

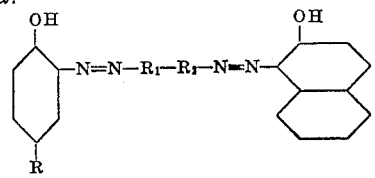

in which R is an alkyl group having more than two carbon atoms, and $R_1$—$R_2$ is a 3,3' benzidine disulfonic acid.

MOSES L. CROSSLEY.
LINCOLN M. SHAFER.